Jan. 6, 1970   P. A. WEBSTER ET AL   3,488,596

BATTERY OPERATED RADIO RECEIVER

Filed March 7, 1966

Inventor
PETER A. WEBSTER
DENNIS A. CLARE
JOHN R. BRINKLEY
By
Browne, Schuyler & Beveridge
Attorney

INVENTOR.
HELMAR SCHLEIN

ATTORNEY

INVENTOR.
HELMAR SCHLEIN

United States Patent Office 3,488,597
Patented Jan. 6, 1970

3,488,597
PULSE AVERAGING CIRCUIT
Helmar Schlein, Reseda, Calif., assignor to North
American Rockwell Corporation
Filed Aug. 30, 1967, Ser. No. 664,383
Int. Cl. H03d 3/04
U.S. Cl. 328—135                                 5 Claims

ABSTRACT OF THE DISCLOSURE

A circuit which obtains the difference of two voltage levels existing at particular instants of time and then averages the series of voltage differences over selected periods of time. The averaging is done by electronically integrating such voltage differences with a time constant selected such that the integrating circuit takes account of both the number of voltage differences integrated and the time between them. The output thus obtained is proportional to the sum of the differences divided by the number of differences.

BACKGROUND

The present invention relates to electric integrating circuits which function to produce an output signal representative of the average magnitude of a series of input voltage levels.

In measuring the amplitudes of a series of pulses it is often desirable to read the average amplitude of such pulses in order to minimize the effect of random error signals. Generally this is done by electronically integrating these pulses over a select period of time and reading the integrator output. The reading thus obtained is proportional to the sum of the amplitudes. Unless it is known how many pulses were integrated during this period only the time average of the pulse amplitudes may be calculated.

As used herein "pulse amplitude" refers to the change in signal potential from a reference line to which the signal returns at the end of the pulse period. In addition, the phrase "time average amplitude" of a series of input pulses is defined as the sum of the amplitudes of all pulses during a specified time interval divided by that time interval whereas the "number average amplitude" of a series of input pulses is the sum of the pulse amplitudes of a determined number of pulses divided by that number.

In an electrochemical analysis system of the pulse polarographic type, disclosed in more detail in copending application, Ser. No. 351,931, filed Mar. 16, 1964, now U.S. Patent No. 3,420,764 and incorporated herein by reference, a series of pulses are applied to an electrolytic cell. The series of input pulses are superimposed on a subfunction which is increasing (or decreasing) in voltage, e.g., a ramp function. At any particular voltage value of this increasing/decreasing subfunction the cell current output pulse as converted to a voltage signal by means of a resistance will be distorted by a noise signal so that it becomes necessary to stop the increase/decrease of the subfunction and repulse the cell at that particular voltage level of the subfunction one or more times until an accurate average output pules can be obtained which minimizes the random error signal. In practice it is necessary to do this at every incremental voltage level of the subfunction and so a system for giving the number average amplitude of a series of input pulses is necessary.

SUMMARY OF INVENTION

Applicant's device is a system for providing the number average amplitude of a series of input pulses by selecting an initial and final value of each incoming pulse, at regular time intervals measured by a pulse generator electronically integrating the difference of each pair of values over the regular time interval with a time constant which is proportional to the product of the number of pairs of values integrated and the regular time interval. The length of integration time, transfer of the final integrator output and resetting of the integrator is done by gates controlled by the output of a counter fed by the pulse generator.

It is the object of this invention to provide a pulse-amplitude averaging circuit which gives the number average of input pulse amplitudes.

It is another object of this invention to provide an electronic integrating circuit the time constant of which may be adjusted so that the integrated output represents the number average amplitude of a series of input pulses.

Another object of this invention is to provide an electronic averaging circuit in which the differences of two voltage levels selected from each pulse of a series of input pulses may be integrated with a selected time constant so as to give the number average of such differences.

A further object of this invention is to provide an electronic averaging circuit which will take the number average amplitude of a series of input pulses superimposed on a continually increasing or decreasing voltage function for any particular value of such increasing or decreasing voltage function.

These and other objects of the present invention will become more apparent from the following detailed description of various embodiments of the present invention taken together with the drawings, hereby made a part thereof.

BRIEF DESCRIPTION OF THE DRAWINGS

FIG. 3 shows modifications which are made to the embodiment of FIGS. 1 and 2 to adapt that embodiment for use with an electrochemical analysis system of the pulse polarographic type.

FIG. 4(a) graphically illustrates the shape of the input to the embodiment of FIGS. 1 and 2 with the time width of the pulse greatly exaggerated.

FIG. 4(b) graphically illustrates an exemplary input to the embodiment of FIGS. 1 and 2.

FIG. 4(c) graphically illustrates the input to the integrator portion of the embodiment of FIGS. 1 and 2.

FIG. 4(d) graphically illustrates the output of the integrator portion of the embodiment of FIGS. 1 and 2.

FIG. 4(e) graphically illustrates an exemplary current output (converted to a voltage signal by means of a resistance 80) of an electrolytic cell during pulse polarography.

FIG. 4(f) graphically illustrates an exemplary output of amplifier 160 where the pulse averaging circuit of FIG. 3 is set to average four pulses.

FIG. 4(g) graphically illustrates an exemplary output of flip flop 21 where the pulse averaging circuit of FIG. 3 is set to average four pulses.

FIG. 4(h) graphically illustrates an exemplary output of flip flop 22 where the pulse averaging circuit of FIG. 3 is set to average four pulses.

FIG. 4(i) graphically illustrates an exemplary output of set-reset flip flop 25b where the pulse averaging circuit of FIG. 3 is set to average four pulses.

FIG. 4(j) graphically illustrates an exemplary output of one-shot multivibrator 81 where the pulse averaging circuit of FIG. 3 is set to average four pulses.

FIG. 4(k) graphically illustrates an exemplary output of set-reset flip flop 25a where the pulse averaging circuit of FIG. 3 is set to average four pulses.

DESCRIPTION OF PREFERRED EMBODIMENT

Figure 1:
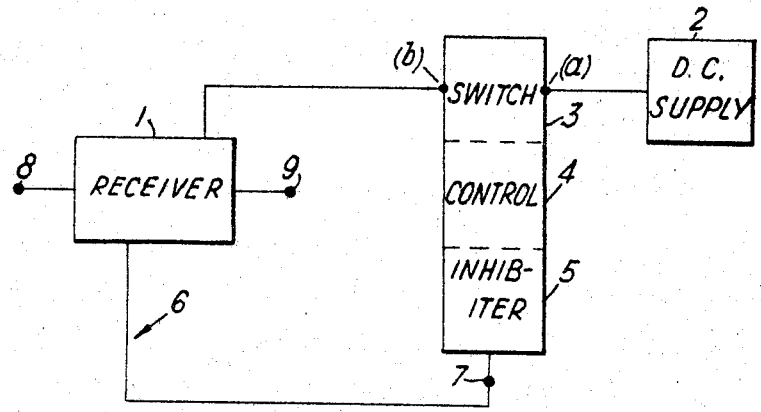
FIG. 1 is a circuit diagram of one embodiment of the present invention.
Figure 4:
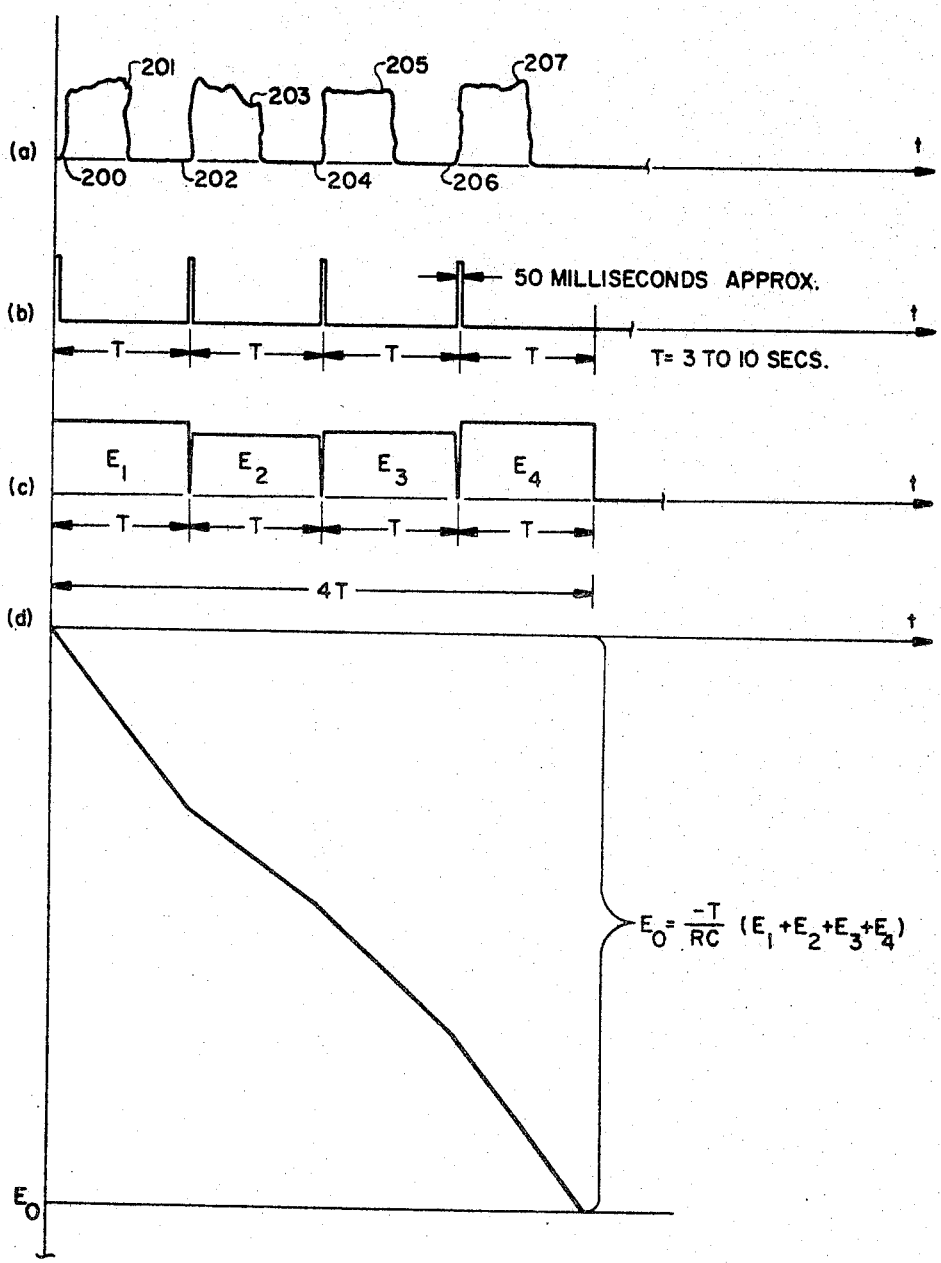
FIG. 4(*l*) graphically illustrates an exemplary output of one-shot multivibrator 71*c* where the pulse averaging circuit of FIG. 3 is set to average four pulses.
Figure 4:
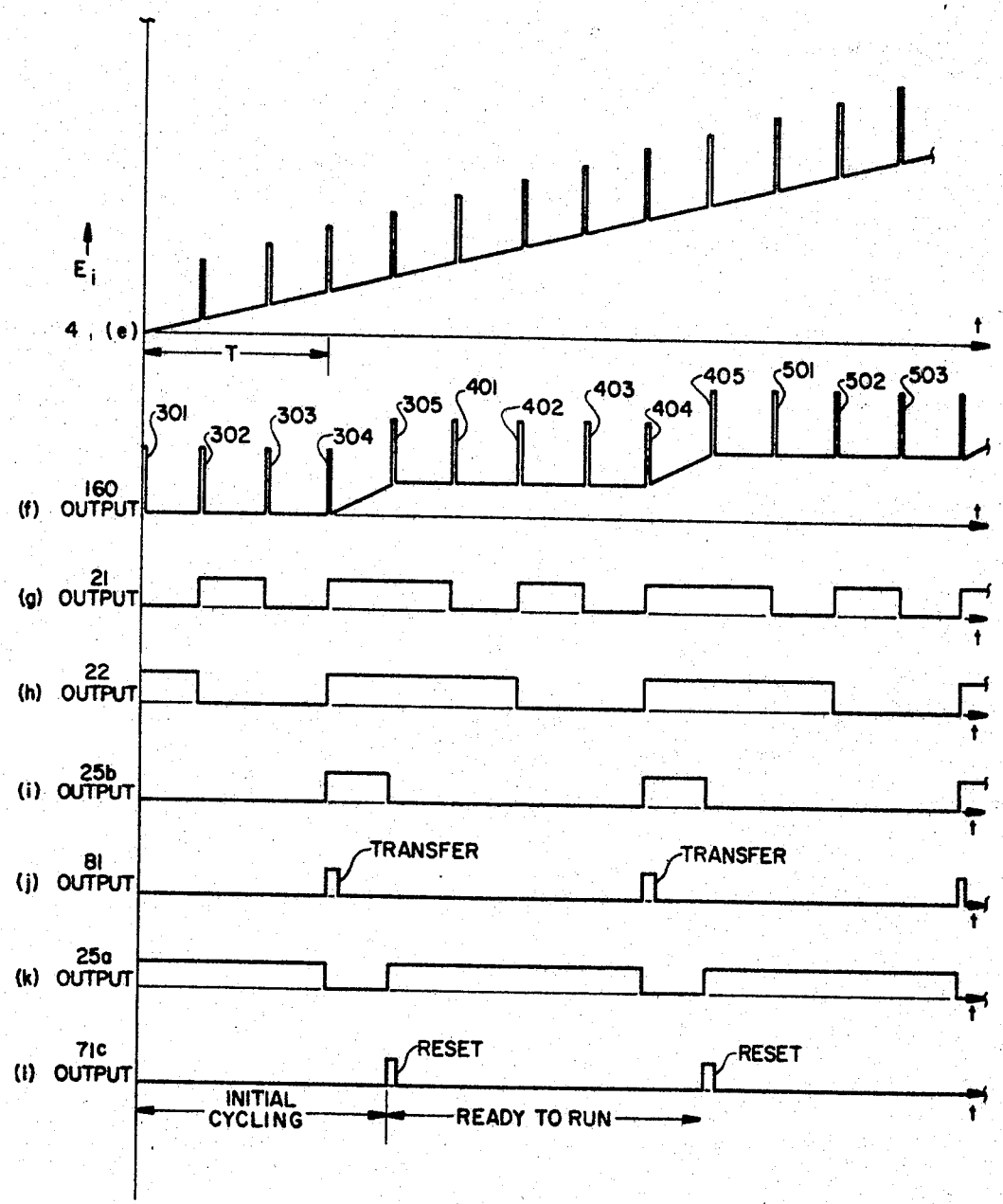

Referring now to the drawings in detail, the circuit of FIG. 1 shows an input signal source $E_i$ which, for the purposes of this description, has the general form shown in FIGS. 4(*a*) and 4(*b*). As shown in exaggerated form in FIG. 4(*a*) the pulses are somewhat irregular because of inherent noise signals. This signal is applied to dynamic voltage suppressor circuit 30, which is disclosed in more detail in copending application, Ser. No. 371,334, filed June 1, 1964, and which is incorporated herein by reference. The output of dynamic voltage suppressor circuit 30 is connected to variable resistance means 40. The other end of variable resistance means 40 is connected to the input of amplifier 60, one end of variable capacitance means 50, and the input of gate 70. The variable resistance means 40 is ganged through means 47 with a control in the pulse generator 10 so that variable resistance means 40 will have a predetermined resistance for any particular pulse repetition rate selected, i.e., for any particular T as shown in FIG. 4(*b*). Likewise variable capacitance means 50 is ganged through means 55 with a selector in counter 20 which determines how many pulses will be averaged and so has a corresponding capacitance for any number of pulses selected to be averaged. The product of the values of variable resistance 40 and variable capacitance 50 determines the time constant of integration of amplifier 60 connected in this integration mode as will be discussed further in this description. The output of amplifier 60 is connected to the other end of variable capacitance means 50, the output of gate 70, and the input of gate 80. The output of gate 80 is connected to capacitor 90, or other means for storing energy, and to the input of high input-impedance amplifier 100. The other end of capacitance 90 is connected to the common signal lead. The output signal $E_o$ appears at the output of amplifier 100.

The output of pulse generator 10 is a series of pulses at regular time intervals, substantially narrower than those of $E_i$ shown in FIG. 4(*b*) but synchronized in time with input signal $E_i$, by means of synchronizer 15 connected between pulse generator 10 and input signal source $E_i$, so as to come shortly before the leading edge of the pulse of signal $E_i$ and thereby provide a selection control time interval as will be explained hereinafter. Such a synchronizer could consist of any of various timing circuits or mechanisms well known in the art which would be keyed by the preceeding pulse from $E_i$. As will be explained in the description of the modified embodiment of FIG. 3, synchronizer 15 becomes unnecessary when the pulse averaging circuit is used in connection with an electrochemical analysis system of the pulse polarograph type because pulse generator 10 supplies one component (delayed by multivibrator 150) of the input to the electrolytic cell 170 whose current output pulse is converted to a voltage signal is $E_i$. The delay caused by multivibrator 150 insures that there will be the same selection control time interval between pulses from pulse generator 10 and the pulses of $E_i$ from the cell as in the FIG. 1 embodiment. The output of pulse generator 10 is connected to the control terminal of dynamic voltage suppressor 30 and the input of counter 20. The output of counter 20 is connected to the control terminals of gates 70 and 80.

In operation the dynamic voltage suppressor 30 successively selects and stores particular pairs of values of $E_i$ shown as 200 and 201, 202 and 203, 204 and 205, 206 and 207 in FIG. 4(*a*). The selection of these values is controlled by the pulse generator 10 as will be explained further in the description of FIG. 2. The output of the dynamic voltage suppressor 30 is a series of rectangular pulses of width T shown in FIG. 4(*c*) having amplitudes which represent the difference of each pair of values stored, $E_i(201)-E_i(200)=E_1$. The amplifier 60, variable resistance means 40 and variable capacitance means 50 comprise an electronic integrating circuit.

When a rectangular pulse is integrated the output is a ramp having a slope equal to the amplitude of the pulse for the duration of the pulse. The integration of a series of such pulses is a series of ramps, each succeeding ramp starting off where the preceeding ramp ended (FIG. 4(*d*)), i.e.:

$$e_i(t) = E_1 \text{ for } t \text{ between } o \text{ and } T$$
$$= E_2 \text{ for } t \text{ between } T \text{ and } 2T$$
$$= E_3 \text{ for } t \text{ between } 2T \text{ and } 3T$$
$$= E_4 \text{ for } t \text{ between } 3T \text{ and } 4T$$

and $$e_o(t) = -\frac{1}{RC} \int_0^t e_i(t) dt$$

where R and C are select values of variable resistance means 40 and variable capacitance means 50, respectively, $e_i(t)$ is the input to variable resistance means 40 and $e_o(t)$ is the output of amplifier 60.

So $$e_o(t) = -\frac{1}{RC}\left(\int_0^T E_1 dt + \int_T^{2T} E_2 dt + \int_{2T}^{3T} E_3 dt + \int_{3T}^{4T} E_4 dt\right)$$

$$= -\frac{T}{RC}(E_1 + E_2 + E_3 + E_4)$$

but letting E equal some average value of $$E_1, E_2, E_3, E_4 \text{ and } \epsilon_1 = E - E_1,$$
$$\epsilon_2 = E - E_2, \text{ etc.}$$

that is $\epsilon_1, \epsilon_2, \epsilon_3, \epsilon_4$ represent noise superimposed on the average value E, then $$e_o(t) = -\frac{4TE}{RC}(\epsilon_1 + \epsilon_2 + \epsilon_3 + \epsilon_4)$$

Summing the noise voltages $\epsilon_1$ to $\epsilon_4$ lessens their effect on $e_o$ as they are random signals and tend to cancel each other. In this way a truer reading of $e_o$ is obtained. By choosing $$RC = +\frac{nT}{K}$$

where n is the number of pulses averaged and K is a constant corresponding to fixed circuit values, then $E_o$ will equal $-KE$ for any select number of pulses to be averaged and for any selected time between pulses.

At the end of the averaging period counter 20 puts out a pulse which closes gates 70 and 80 momentarily. This has the effect of storing the output of amplifier 60 on capacitor 90 and also resetting the integrator circuit to a zero initial condition by discharging variable capacitance 50. Gate 70 delays a finite time in closing until gate 80 has reopened and so capacitor 90 is not also "reset" to a zero initial condition by gate 70. The value stored on capacitor 90 is then amplified by high input impedance amplifier 100 and is read as $E_o$. Amplifier 100 is only used as an isolating device to prevent the discharge of capacitor 90 and can easily be replaced with various other such high input impedance devices well known to those skilled in the art. Of course, if a positive value of $E_o$ is desired for positive values of $E_i$ then amplifier 100 may be chosen with a gain of $-1$.

Figure 2:
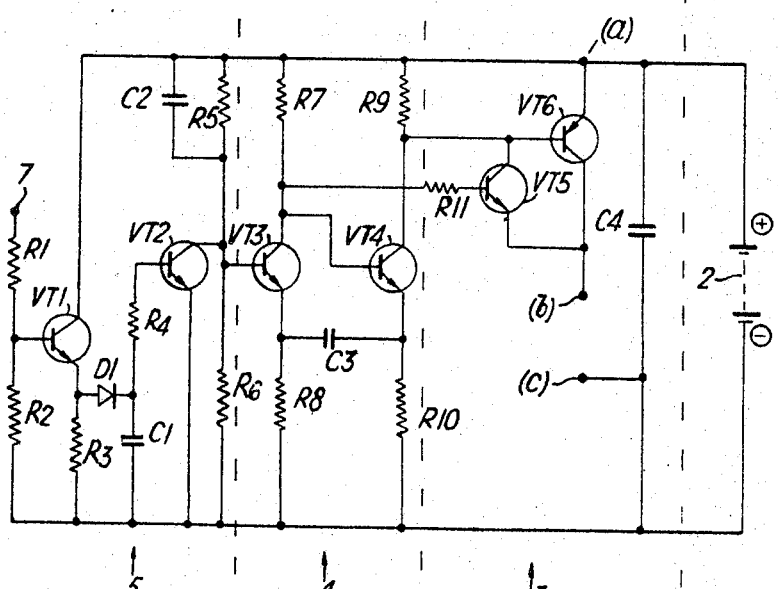
FIG. 2 is a more detailed diagram of the embodiment shown in FIG. 1.
Figure 2:
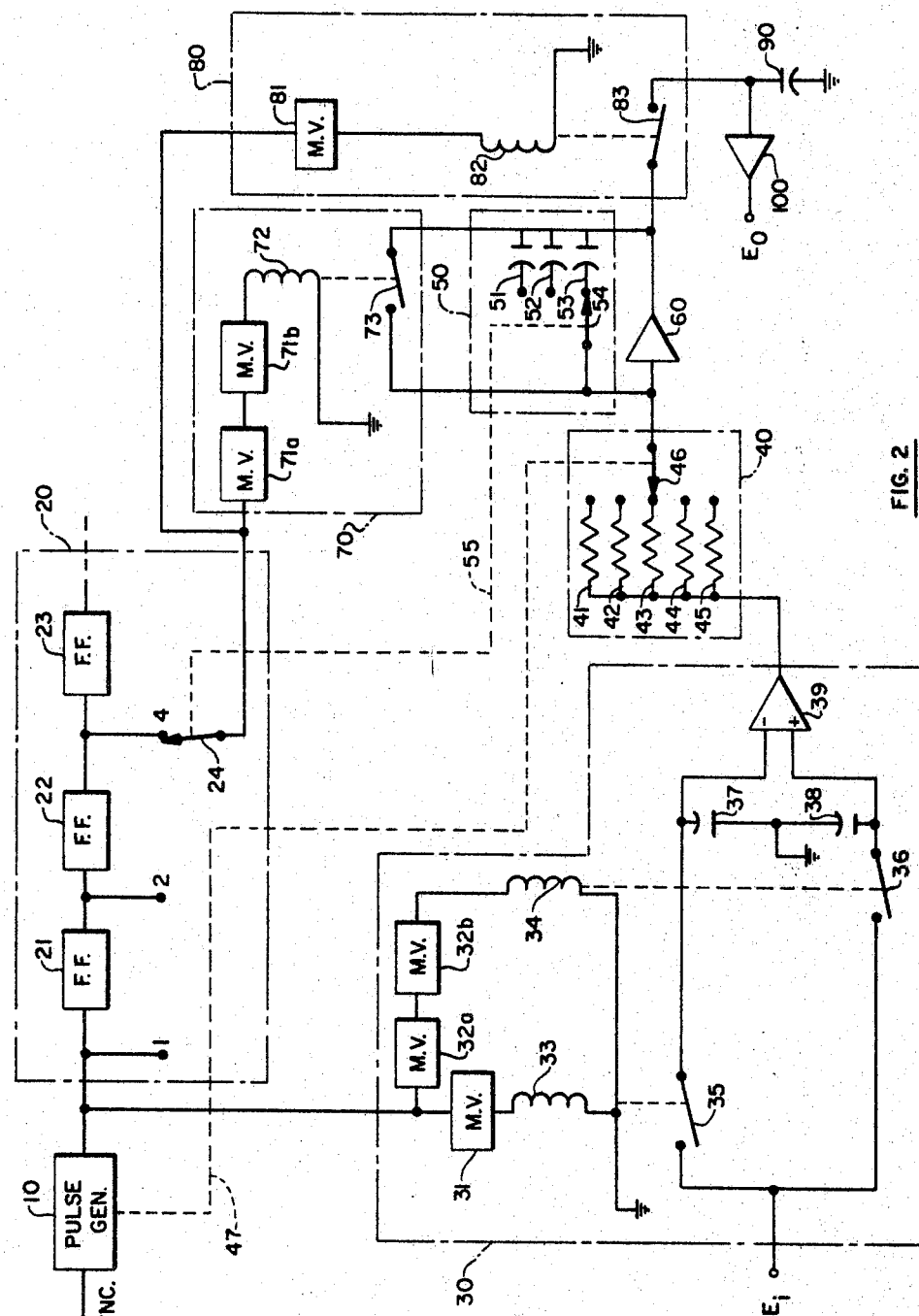

Referring now to FIG. 2, the embodiment of FIG. 1 is shown in greater detail. Pulse generator 10 is connected to a series of flip flop circuits 21–23 (any number of flip flops may be chosen). The output of flip flops 21, 22 or 23, depending on the number of pulses to be averaged, is selected by switch 24 and fed to one shot multivibrators 71*a*–71*b* and 81. The outputs of one shot multivibrators 71*a*–71*b* and 81 are connected to relay coils 72 and 82, respectively, which in turn operate switches 73 and 83, respectively. Switch 73 is connected in parallel with amplifier 60 and together with relay coil 72 and one shot multivibrators 71a and 71b, which are connected in series to produce a delayed output pulse, comprises the integrator reset gate 70 shown in FIG. 1. One side of switch 83 is connected to the output of amplifier 60 and the other side is connected to capacitor 90 and amplifier 100. Switch 83 together with relay coil 82 and one shot multivibrator 81 comprise the output gate 80 shown in FIG. 1.

Pulse generator 10 is also connected to the inputs of one shot multivibrators 31 and 32a–32b. The output of one shot multivibrator 31 is connected to operate relay coil 33 which in turn controls switch 35. One end of switch 35 is connected to the input signal source $E_i$ and the other end of switch 35 is connected to one side of capacitor 37. The same terminal of capacitor 37 is connected to one input terminal of high input impedance differential amplifier 39. One shot multivibrators 32a–32b, in series so as to produce a delayed output pulse, are connected to operate relay coil 34 which in turn operates switch 36. One side of switch 36 is connected to input source $E_i$ and the other side of switch 36 is connected to capacitor 38. The same terminal of capacitor 38 is connected to the other input of high input impedance differential amplifier 39. The other ends of capacitors 37 and 38 are connected to ground or the common signal lead.

The output of differential amplifier 39 is connected to one end of resistors 41 through 45. The other ends of resistors 41 through 45 are connected to separate terminals of switch 46. The pole of switch 46 is ganged through means 47 with the control in pulse generator 10 which determines the pulse frequency of pulse generator 10, i.e., the time between pulses T as shown in FIG. 4(b). The values of the resistors 41 through 45 are such, and the pole of switch 46 is ganged in such a way, that when the pulse repetition rate is decreased (the time T correspondingly increased) the pole of switch 46 is connected with a resistance of higher value than that formerly in contact with the pole. The value of the resistance is preselected to correspond to the particular increased pulse period T as explained above.

The output of variable resistance means 40, which is the pole terminal of switch 46, is connected to the input of amplifier 60 and the pole of switch 54. One end of each capacitance 51 through 53 is connected to the output of amplifier 60 and the other ends of capacitances 11 through 53 are connected to separate terminals of switch 54. The pole of switch 54 is ganged through means 55 with switch 24 so that when a larger or smaller number of pulses are chosen to be averaged by switch 24 the pole of switch 54 connects to corresponding preselected larger or smaller capacitors as explained in the description of FIG. 1. The output of amplifier 60 is connected to gate 80.

It is immaterial which of the two components of the integrating circuit is varied in correspondence to changes in the number of pulses to be averaged or changes in the time between pulses. Therefore, it would also be within the scope of this invention to make the variable resistance means 40 change with the number of pulses to be averaged and variable capacitance means 50 change with the pulse time interval T. With reference to the embodiment of FIG. 2 switch 46 could be ganged with switch 24 and switch 54 ganged with the pulse repetition rate control of pulse generator 10.

In operation the output pulses of pulse generator 10 will come a finite time, called herein the selection control time interval, before the leading edge of the $E_i$ pulses as explained in the description of FIG. 1. Referring now to FIG. 2, each pulse out of pulse generator 10 will cause the output of flip flop 21 to alternate from one voltage level to another. For the purpose of this description, it is assumed that flip flops 21 through 23 and all the one shot multivibrators used in this embodiment are triggered by a positive going step voltage (though they could also be selected to be triggered by a negative going step), and further that all flip flops are initially "on," i.e., the output is at a positive level. The first pulse into flip flop 21 will cause it to turn "off," i.e., its output becomes more negative. The second pulse into it will cause it to turn on again. This positive going step output from flip flop 21 on the second pulse is fed into flip flop 22 turning it off. Pulses three and four into flip flop 21 turn it off and on and the positive going step out of flip flop 21 from the fourth pulse also turns flip flop 22 on.

The positive step out of flip flop 22 is fed to a one shot multivibrator 81 triggering it on for a predetermined period of time during which it energizes relay coil 82 and closes output switch 83 returning to its stable off position after the period has elapsed and remaining off until repulsed. In a similar manner one shot multivibrator 71a is also triggered off momentarily by the positive going pulse out of 22. As multivibrator 71a returns to it stable on state its positive going output triggers multivibrator 71b momentarily on during which time 71b energizes relay coil 72 which closes integrator reset switch 73. The delay imposed by multivibrator 71a in actuating switch 73 allows switch 83 to close and open and thereby store the output of amplifier 60 on capacitor 90 before the integrating circuit is reset by the closing of switch 73.

The output of pulse generator 10 is also fed to one shot multivibrators 31 and 32a–32b. Each pulse triggers multivibrator 31 momentarily on, energizes relay coil 33 and momentarily closes switch 35 thereby storing on capacitor 37 the value of $E_i$ at points 200, 202, 204, etc., as shown in FIG. 4(a). It is necessary that the pulse from pulse generator 10 precede the pulse $E_i$ by the selection control time interval in order that the values of $E_i$ at 200, 202, 204, 206, etc., of FIG. 4(a) which actually precede the pulse of $E_i$ may be selected and stored on capacitor 37. Similarly, each pulse from generator 10 triggers series one shot multivibrators 32a momentarilly off and 32b momentarily on, in the same manner as explained for multivibrators 71a–71b above, energizing relay coil 34 and closing switch 36 a finite time after the pulse from generator 10 was received by multivibrator 32a. This delay time is so selected that switch 36 closes just slightly before and opens at points 201, 203, 205, etc., as shown on FIG. 4(a) and thereby stores those values on capacitor 38. The input signal source $E_i$ is of such low impedance that the voltage level on capacitors 37 and 38 adjusts to the values of $E_i$ stored on them when switches 35 and 36, respectively, are closed.

The inputs of high input impedance differential amplifier 39 are connected to capacitors 37 and 38 so that the output of 39 is a voltage level which represents the difference of the values stored on capacitors 37 and 38. As shown in FIG. 4(c), this level changes after every time period T, i.e., for each pulse out of pulse generator 10. These levels are then fed through the integrator circuit comprised of amplifier 60, a select one of resistors 41 through 45, and a select one of capacitors 51 through 53 where it is integrated as described above with respect to FIGS. 1 and 2.

Referring now to FIG. 3, the embodiment of FIGS. 1 and 2 is shown as adapted to work with a pulse polarograph as discussed above. Pulse generator 10 is no longer connected to synchronizer 15 and its output is connected to the pole of single pole, double throw switch 27. Flip flop 21 is connected to the terminal of switch 27 which is normally connected to the pole of switch 27. As in the embodiment of FIG. 2, the output of flip flop 21 is connected to the input of flip flop 22, etc. The terminals of switch 24 are separately connected to the outputs of the counter flip flops 21 through 23 as in the embodiment of FIG. 2 but the pole of switch 24 is now only connected to one input of set-reset flip flop 25a and one input of set-reset flip flop 25b.

The output of 25a is connected to the input of one shot multivibrator 71c and relay coil 120. The other end of relay coil 120 is returned to common potential. One shot multivibrator 71c replaces components 71a–71b of the embodiment of FIG. 2 and its output is connected to relay coil 72. The output of 25b is connected to energize relay coil 26, which operates switch 27, and to the input of one shot multivibrator 81 of the embodiment of FIG. 2. The other end of relay coil 26 is returned to common potential.

Relay coil 120 operates switch 125 one end of which is connected to the output of ramp control means 130 and the other end of which is connected to ramp generator 140. The output of ramp generator 140 is connected to the input of amplifier 160. The output of pulse generator 10 is connected to the input of one shot multivibrator 150 which acts as a delay means. The output of multivibrator 150 is connected to the input of amplifier 160 so that the output of amplifier 160 is the sum of the ramp output of 140 and the delayed pulse output of 150. This output of 160 is fed to an electrode of the electrolytic cell of the pulse polarograph and has the form shown in FIG. 4(f). The output of pulse generator 10 is also connected to 31 and 32a–32b as in the embodiment of FIG. 2. The remaining connections and components are the same as in the FIG. 2 embodiment.

The operation of the modified embodiment of FIG. 3 is similar to that of FIG. 2. The major changes in circuitry were necessitated because of timing problems in stopping the ramp and then averaging the selected voltage differences over the correct number of pulse-spaced intervals.

As shown in FIG. 4(f), after the initial cycling period required to align all the logic components in the averaging circuit, five pulses are counted to define four intervals of time in which to integrate, i.e., average, the difference values selected from four pulses. Specifically, in FIG. 4(f) a difference is selected from pulse 305 which is fed to the integrator and integrated during the interval between pulses 305 and 401. The difference value selected from pulse 401 is integrated until pulse 402, etc. Immediately after (i.e., within a few milliseconds) pulse 404 the output of amplifier 60 is transferred and stored on capacitor 90 by means of switch 83. The difference selected from pulse 404 was not integrated for any appreciable length of time and hence was not averaged in that transferred value. Pulse 405 (as did pulse 305) keys the integrator reset switch 73 (see FIG. 2) and resets the integrator by discharging capacitance means 50 within a few milliseconds after pulse 405. But the dynamic voltage suppressor 30 (see FIG. 1) continues to feed the difference value selected from pulse 405 into the integrator which integrates it for substantially the full interval between pulses 405 and 501, and the averaging cycle repeats.

It is possible to use the embodiment of FIG. 1 in conjunction with the pulse polarograph and only count four pulses to average four, but the embodiment of FIG. 3 as modified in FIG. 3 obviates two drawbacks of that approach. The first advantage of the modified embodiment of FIG. 3 is that no complicated timing circuitry is required to transfer and store the output of amplifier 60, reset amplifier 60, and stop and start ramp function between averaging periods. If the FIG. 1 embodiment were used the fourth pulse (if four are to be averaged) would have to key the ramp switch and start the ramp going. Shortly *before* the fifth pulse a clock pulse would be required to transfer and store the output of amplifier 60. Shortly after that pulse another would be required to reset the amplifier 60. Then the fifth pulse could key the stopping of the ramp. In performing all these functions before the fifth pulse a finite amount of time is taken from the period during which amplifier 60 would normally be integrating and this leads to a small amount of inaccuracy. The modified embodiment of FIG. 3 overcomes these difficulties by counting an extra pulse to reset the amplifier 60 and also stop the ramp function as explained above.

The step output of flip flop 22 (see FIG. 4(h)) on the fourth pulse out of pulse generator 10 triggers flip flop 25b into the on position (see FIG. 4(i)). The output of 25b energizes relay coil 26 and thereby closes switch 27 so as to disconnect pulse generator 10 from flip flop 21 and connect it to the other inputs of flip flops 25a and 25b. The output of 25b also triggers multivibrator 81 (FIG. 4(j)) which then operates as in the FIG. 2 embodiment to momentarily close the output switch 83 and store the averaged value on capacitor 90.

Flip flop 25a was initially on before being pulsed by the output of flip flop 22 and is therefore turned off by flip flop 22 on the fourth pulse out of generator 10 (FIG. 4(k)). This de-energizes relay coil 120 closing switch 125. The ramp rate is then fed to the generator 140 with the effect that the ramp starts running after the last pulse is averaged, e.g., between pulses 404 and 405 in FIG. 4(f). The fifth pulse from 10 is fed directly to the inputs of 25a and 25b thereby resetting them to their initial conditions (FIGS. 4(i), (k)).

The initial condition of 25b is off, so on the fifth pulse 25b goes off, its output drops to zero de-energizing relay coil 26 which in turn re-throws switch 27 and reconnects pulse generator 10 to flip flop 21 which resumes its "counting" of the pulses. The initial condition of 25b is on so the fifth pulse returns it to that state. This energizes relay coil 120 and opens switch 125 again, stopping the ramp at the particular voltage level when the fifth pulse occurred. The positive going output of 25a when it comes on also triggers one shot multivibrator 71c which in turn operates relay coil 72 and switch 73 to reset the integrator circuit in a similar manner as in the FIG. 2 embodiment.

During the initial cycling period all of the flip flops become properly aligned no matter what their initial state when the power to the system is turned on. The initial cycling period would not be more than the number of pulse intervals to be averaged no matter what combination of initial states existed in counter 20.

While the embodiment of FIG. 3 uses two set-reset flip flops connected essentially in parallel to avoid loading problems it would be within the scope of this invention to use a single set-reset flip flop connected and operated as flip flop 25b. Relay coil 120 and the one shot multivibrator used to momentarily close switch 83 would be connected to the output of flip flop 25b. Switch 125 would then have to be normally open and the one shot multivibrator substituted for 71c would have to be triggered by a negative going voltage level.

Counter 20, as shown in FIG. 2, counts a $2^n$ number of pulses but could easily be modified by those skilled in the art to count any number of pulses.

The present invention is not limited to the specific details of the particular embodiments described since many modifications will be apparent to those skilled in the art. For example, relay operated switches 35, 36, 73, 83 and 125 could be replaced by electronic, e.g., semiconductor, switches; switch 46 and resistances 41 through 45 could be replaced by a potentiometer; and switch 54 and capacitors 51 through 53 could be replaced by a continuously variable capacitor. Further, the pulse generator 10, synchronizer 15, flip flops 21–25b, one shot multivibrators 31, 32a, 32b, 71a, 71b, 71c, 81 and 150, amplifiers 39, 60, 100 and 160, ramp rate control 130 and ramp generator 140 are electronic circuits known in the art and therefore have not been shown or described in detail. Therefore, the scope of the present invention is limited only by the appended claims.

I claim:

1. A system for averaging a series of voltage differences taken from an incoming signal at select regular time intervals comprising means for generating pulses at regular time intervals;

means for counting a preselected number of pulses from said pulse generating means and generating an output pulse responsive to said preselected number of pulses;

means, including said pulse generating means, responsive to an incoming signal for providing a selection control time interval between one of said preselected pulses and an incoming signal;

means for selecting and storing at least a pair of voltage levels of an incoming signal and generating an output signal representing the difference between said levels, said selection being responsive to said selection control time interval means, voltage integrating means responsive to the output of said selecting and storing means and having a variable time constant of integration dependent on said preselected number of pulses and said regular time interval between said pulses, the output of said voltage integrating means being proportional to the number average of the voltage differences of each pair of voltage levels selected by said selecting and storing means, first gating means responsive to the output of said counting means and said integrating means for gating the integrator output to a signal storage means, and second gating means responsive to the output of said counting means for resetting the voltage integrating means to an initial condition.

2. The system of claim 1 wherein said voltage intergrating means includes, a variable resistance connected between the output of said selecting and storing means and the input of an amplifier whose output is that of said voltage integrating means;

a variable capacitance means connected in parallel with said amplifier;

the values of said variable resistance and said variable capacitance being so chosen that $$RC = nT/K$$

where:
R = resistance
C = capacitance
$n$ = said preselected number of pulses
T = said regular time interval between said preselected number of pulses
K = dimensionless constant.

3. The system of claim 1 wherein said second gating means includes switching means connected in parallel with said variable capacitance means operable in response to said counting means output.

4. The system of claim 1 including means responsive to said pulse generating means and said counting means for generating an output signal representative of said pulse generator output but delayed a finite time thereafter, said output signal voltage potential being increased with each of said output pulses of said counting means.

5. The system of claim 4 wherein said system is comprised of delay means for generating a delayed response to said pulse generating means;

ramp generating means for generating a linearly changing voltage signal whose rate of change with respect to time is controlled by a ramp control means;

switching means responsive to the output of said counting means for connecting said ramp rate control means to said ramp generating means;

summing means responsive to said ramp generating means and said delay means for generating an output which is the sum of their outputs.

References Cited

UNITED STATES PATENTS

| | | | |
|---|---|---|---|
| 3,116,458 | 12/1963 | Margopoulos | 328—135 |
| 3,252,099 | 5/1966 | Dodd | 328—127 |

JOHN S. HEYMAN, Primary Examiner

U.S. Cl. X.R.

328—117, 127, 151